(12) United States Patent
Mehta et al.

(10) Patent No.: US 12,111,015 B2
(45) Date of Patent: *Oct. 8, 2024

(54) SYSTEM AND METHOD FOR STORAGE OF LIQUID HYDROGEN AT LOW PRESSURE

(71) Applicant: PRELOAD CRYOGENICS, LLC, Quincy, MA (US)

(72) Inventors: Sanjay Mehta, Hauppauge, NY (US); Eric T. Reaman, Hingham, MA (US)

(73) Assignee: PRELOAD CRYOGENICS, LLC, Quincy, MA (US)

( * ) Notice: Subject to any disclaimer, the term of this patent is extended or adjusted under 35 U.S.C. 154(b) by 48 days.

This patent is subject to a terminal disclaimer.

(21) Appl. No.: 17/860,262

(22) Filed: Jul. 8, 2022

(65) Prior Publication Data
US 2023/0008486 A1   Jan. 12, 2023

Related U.S. Application Data

(60) Provisional application No. 63/249,205, filed on Sep. 28, 2021, provisional application No. 63/219,548, filed on Jul. 8, 2021.

(51) Int. Cl.
*F17C 3/02* (2006.01)

(52) U.S. Cl.
CPC ...... *F17C 3/022* (2013.01); *F17C 2203/0341* (2013.01); *F17C 2203/0626* (2013.01); *F17C 2203/0643* (2013.01); *F17C 2221/012* (2013.01)

(58) Field of Classification Search
CPC ............. F17C 3/022; F17C 2203/0341; F17C 2203/0626; F17C 2203/0643;
(Continued)

(56) References Cited

U.S. PATENT DOCUMENTS 2,777,295 A * 1/1957 Bliss ................ F17C 3/022
52/220.8
3,215,313 A 11/1965 Stelts
(Continued)

FOREIGN PATENT DOCUMENTS

CN   111473243 A   7/2020
EP   3317577 B1   5/2021
(Continued)

OTHER PUBLICATIONS

Written Opinion of the International Searching Authority dated Oct. 13, 2022.
(Continued)

*Primary Examiner* — Shawn M Braden
(74) *Attorney, Agent, or Firm* — Jacob M. Ward; Ward Law Office LLC (57) ABSTRACT

A cryogenic liquid storage system is provided that includes a primary container, an insulation portion, a secondary container, and a pressure release feature. The primary container includes a metal sidewall and a metal dome. Alternatively, the primary container may be constructed out of composite material. The primary container may be configured to retain liquid hydrogen. The insulation portion covers the primary container. The secondary container includes a composite material that covers each of the primary container and the insulation portion. The pressure release feature is disposed through each of the primary container dome, the insulation portion, and the secondary container dome.

16 Claims, 3 Drawing Sheets

(58) Field of Classification Search
CPC ........ F17C 2221/012; F17C 2201/0119; F17C 2201/052; F17C 3/00; F17C 2201/0109; F17C 2201/032; F17C 2203/035; F17C 2203/0604; F17C 2203/0639; F17C 2203/0663; F17C 2203/0678; F17C 2203/0695; F17C 2223/0161; F17C 2223/033; Y02E 60/32
See application file for complete search history.

(56) References Cited

U.S. PATENT DOCUMENTS

| | | | |
|---|---|---|---|
| 3,488,972 | A | 1/1970 | Closner |
| 3,558,000 | A * | 1/1971 | McCann ................. F17C 3/022 220/565 |
| 3,860,140 | A | 1/1975 | Wichman et al. |
| 4,021,982 | A | 5/1977 | Kotcharian |
| 5,018,639 | A * | 5/1991 | Schafer ................. F17C 13/126 165/104.19 |
| 5,386,706 | A | 2/1995 | Bergsten et al. |
| 8,162,167 | B2 | 4/2012 | Da Silva et al. |
| 9,284,120 | B2 | 3/2016 | Oates |
| 10,597,888 | B2 | 3/2020 | Mehta et al. |
| 2005/0144864 | A1* | 7/2005 | Skovholt ................. F17C 3/022 52/223.3 |
| 2016/0091140 | A1 | 3/2016 | Takagi et al. |
| 2021/0131610 | A1 | 5/2021 | Kim et al. |
| 2023/0008486 | A1 | 1/2023 | Mehta et al. |

FOREIGN PATENT DOCUMENTS

| | | |
|---|---|---|
| WO | 2002048602 A1 | 6/2002 |
| WO | 2008154169 A1 | 12/2008 |
| WO | 2017018699 A1 | 2/2017 |

OTHER PUBLICATIONS

Vanessa Tietze, Sebastian Luhr, and Detlef Stolten, "Bulk Storage Vessels for Compressed and Liquid Hydrogen".

Joakim Andersson and Stefan Gronkvist, "Large-Scale Storage of Hydrogen", Division of Energy Processer, KTH Royal Institute of Technology, SE-10044 Stockholm, Sweden.

Steward S.A., "Review of Hydrogen Isotope Permeability Through Materials," Lawrence Livermore National Laboratory, University of California, Aug. 15, 1983.

George R. Caskey, "Hydrogen Compatibility Handbook for Stainless Steels," Savannah River Laboratory, Aiken, SC 29808, Jun. 1983.

Chris San Marchi and B.P. Somerday, "Technical Reference for Hydrogen Compatibility of Materials," Sandia Report—SAND2012-7321, Sep. 2012.

B. W. Birmingham, E. H. Brown, C. R. Class, and A. F. Schmidt, "Vessels for the Storage and Transport of Liquid Hydrogen," Journal of Research of the National Bureau of Standards, vol. 58, No. 5, May 1957.

Bob Granath, "Innovative Liquid Hydrogen Storage to Support Space Launch Program," NASA Technical Brief, Last updated on Dec. 4, 2019.

The Perlite Institute, Inc., "Properties of Evacuated Perlite," 4305 North Sixth Street, Suite A, Harrisburg, PA 17110.

W U Notardonato, et al., "Zero Boil-off Methods for Large-Scale Liquid Hydrogen Tanks Using Integrated Refrigeration and Storage", IOP Conf. Series: Materials Science and Engineering, 2017.

Hjorteset et al., Development of large-scale precast, prestressed concrete liquefied natural gas storage tanks, Article, PCI Journal, Fall 2013, pp. 40-54, vol. 58, U.S.

Written Opinion of the International Searching Authority dated Dec. 29, 2022.

* cited by examiner

SYSTEM AND METHOD FOR STORAGE OF LIQUID HYDROGEN AT LOW PRESSURE

CROSS-REFERENCE TO RELATED APPLICATIONS

This application claims the benefit of U.S. Provisional Application No. 63/219,548, filed on Jul. 8, 2021, and U.S. Provisional Application No. 63/249,205, filed on Sep. 28, 2021. The entire disclosures of the above applications are incorporated herein by reference.

FIELD

The disclosure generally relates to storage systems and, more particularly, to cryogenic liquid storage systems.

INTRODUCTION

This section provides background information related to the present disclosure which is not necessarily prior art.

Hydrogen is a key component of the clean energy transition given the wide-ranging options for use. Multiple industries are developing uses for hydrogen as a fuel that when produced sustainably (from renewables or through traditional methods plus carbon capture) creates carbon-free emissions at the end user. Hydrogen studies, pilots, and business cases are being developed in heavy duty transportation, power generation, industrial uses such as steel production and ammonia synthesis, and also as a green heating fuel. One important area of study that has not yet gained attention, is the issue of storage. Hydrogen may be stored in either liquid or gaseous form.

The simplest method for storage of gaseous hydrogen is in underground salt caverns. However, this method has geographical limitations and often requires a production resource to be sited near a geologic formation as well as a readily accessible local market. Alternately, many small containers for storage of hydrogen gas have been built. However, for the large-scale storage necessary for commercial applications, hydrogen gas storage becomes very uneconomical because of its very low density. Even after compression at 1000 bar pressure at 20 degrees Celsius, the density of hydrogen gas is only 49.92 kg/m$^3$ (3.11 lb/ft$^3$). It should also be noted that hydrogen is the lightest element with the smallest atomic radius and may easily permeate through metal lattice structures of various storage containers. The phenomenon of hydrogen embrittlement further eliminates many metals from suitable storage of hydrogen gas at ambient temperature, making this method even more expensive.

Storage of hydrogen in a liquid form provides an attractive alternative because liquid hydrogen has a higher physical energy density than compressed gaseous hydrogen. Also, the volume reduction of liquid hydrogen makes it attractive for bulk delivery by truck, train, or ship. Furthermore, liquefaction of hydrogen is a well-established technology. Although testing of metal permeability of hydrogen gas has been performed only at elevated temperatures, there is clear evidence that permeability is reduced significantly with a decrease in temperature, especially at cryogenic temperatures associated with the storage of liquid hydrogen at atmospheric pressure. Thus, storage of hydrogen in a liquid form has many advantages.

Dewars for storage and transport of relatively small volumes of liquid hydrogen have been used since 1957. NASA has also built spheres for storage of liquid hydrogen at the Kennedy Space Center to support the Space Launch System. However, the technology has not yet been developed for scalable commercial storage of liquid hydrogen.

Conversion of hydrogen to ammonia or methanol provides storage options where the hydrogen is converted to a dense liquid carrier form through chemical conversion to create the storage medium and a reformation process to access high purity hydrogen. The benefits of these storage methods, however, are diminished by the additional processes required for conversion and reformation.

In market areas where chemical storage is undesirable or geologic features for storage are unavailable, there is a gap in storage technologies where options include only compressed hydrogen gas tanks with limited energy storage capacity. To facilitate a market for high use cases, affordable liquid hydrogen storage options need to be developed. It is worth noting that the liquid nitrogen market faced similar hurdles in the 1960s and 1970s where dense storage was needed in regions far from gas resources and underground storage. The development of field erected tanks helped these areas gain local, scalable storage where it was uneconomical to build extensive pipeline infrastructure for peak supply situations. However, these liquid nitrogen field erected tanks would be unsuitable to be used in the same manner for liquid hydrogen storage because of boil-off and permeability issues that are unique to liquid hydrogen storage.

Accordingly, there is a need for a commercial cryogenic liquid storage system. Desirably, the cryogenic liquid storage system may efficiently retain liquid hydrogen and may be economically constructed.

SUMMARY

In concordance with the instant disclosure, a cryogenic liquid storage system and method that is configured to be more economically constructed while also efficiently retaining cryogenic liquid, such as liquid hydrogen by reducing the permeability of the storage system, has been surprisingly discovered.

A cryogenic liquid storage system is provided that includes a primary container, an insulation portion, a secondary container, and a pressure release feature. The primary container may include a metal sidewall and a metal dome and is configured to retain cryogenic liquid. The insulation portion may cover the primary container. The secondary container may include a secondary container wall and a secondary container dome. The secondary container wall and dome may include a composite material that may cover each of the primary container wall and dome and the insulation portion. The pressure release feature may be disposed through the liquid storage system. In a particular example, the pressure release feature may be disposed through each of the primary container dome, the insulation portion, and the secondary container dome.

Various ways of assembling the cryogenic liquid storage system are provided. Certain methods may include a step of providing a primary container, an insulation material, and a composite material. The primary container may be disposed in a desired position. The primary container may be covered with the insulation material, forming an insulation portion. Each of the primary container and the insulation material may be covered with the composite material, forming the secondary container.

In certain embodiments, a cryogenic liquid storage system may include a primary container, an insulation portion, a secondary container, and a pressure release feature. The primary container may include a metal sidewall and a metal dome. Alternatively, the primary container may be constructed out of composite material. The primary container may be configured to retain liquid hydrogen. The insulation portion may cover the primary container. The secondary container may include a composite material that may cover each of the primary container and the insulation portion. The pressure release feature may be disposed through each of the primary container dome, the insulation portion, and the secondary container dome.

The primary sidewall may include one of a carbon steel material, a stainless steel material, and combinations thereof. The primary container and the secondary container may be constructed using a similar composite material. In certain embodiments, the insulation portion includes evacuated perlite powder. In particular, the evacuated perlite powder may have a perlite density from 5 lb/ft$^3$ to 9 lb/ft$^3$. The cryogenic liquid storage system may further include an insulative base. The insulative base may include a cellular glass insulation. The secondary container may include a precast, prestressed concrete material with a steel liner disposed on one of an inside and an outside surface of the secondary container. The cryogenic liquid storage system may include liquid hydrogen stored therein.

In certain embodiments, the cryogenic liquid storage system may include a secondary bottom disposed below the insulation portion. The secondary bottom may include an expansion joint configured to permit an expansion and a retraction of the secondary bottom independent from the secondary container. The secondary bottom may include a sand layer below the primary container and a slide bearing below the secondary container. Each of the sand layer, the slide bearing, and the expansion joint may permit the secondary bottom to move independent from the secondary container. In certain embodiments, the cryogenic liquid storage system includes a sketch plate disposed above the slide bearing. The sketch plate may be configured to militate against leaked cryogenic liquid escaping the cryogenic liquid storage system.

A method of assembling a cryogenic liquid storage system may include providing a primary container, an insulation material, and a composite material. The primary container may be disposed in a desired position. The primary container may be covered with the insulation material. Each of the primary container and the insulation material may be covered with the composite material to form the secondary container. A pressure release feature may be disposed through each of the primary container, the insulation material, and the secondary container. In certain embodiments, a secondary bottom may be disposed below an insulation material of the cryogenic liquid storage system. The secondary bottom may include an expansion joint configured to permit an expansion and a retraction of the secondary bottom independent from the secondary container. In certain embodiments, a sand layer, a slide bearing, and the expansion joint permit the secondary bottom to move independent from the secondary container. In certain embodiments, the cryogenic liquid may include liquid hydrogen.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

DETAILED DESCRIPTION

The following description of technology is merely exemplary in nature of the subject matter, manufacture, and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping, or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the FIGS. is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present technology relates to a cryogenic liquid storage system that includes a primary container, an insulation portion, a secondary container, and a pressure release feature. The primary container may include a metal sidewall and a metal dome. Alternatively, the primary container may be constructed out of composite material. The primary container may be configured to retain a cryogenic liquid. The insulation portion may cover the primary container. The secondary container may include a composite material that may cover each of the primary container and the insulation portion. The pressure release feature may be disposed through each of the primary container dome, the insulation portion, and the secondary container dome.

In certain embodiments, the primary sidewall may include one of a carbon steel material, a stainless steel material, and combinations thereof. The primary container and the secondary container may be constructed using a similar composite material. In certain embodiments, the insulation portion includes evacuated perlite powder. In particular, the evacuated perlite powder may have a perlite density from 5 lb/ft$^3$ to 9 lb/ft$^3$. The cryogenic liquid storage system may further include an insulative base. The insulative base may include a cellular glass insulation. The secondary container may include a precast, prestressed concrete material with a steel liner disposed on one of an inside or an outside surface of the secondary container. The cryogenic liquid may include liquid hydrogen.

In certain embodiments, the cryogenic liquid storage system may include a secondary bottom disposed below an insulation layer. The secondary bottom may include an expansion joint configured to permit an expansion and a retraction of the secondary bottom independent from the secondary container. The secondary bottom may include a sand layer below the primary container and a slide bearing below the secondary container. Each of the sand layer, the slide bearing, and the expansion joint may permit the secondary bottom to move independent from the secondary container. In certain embodiments, the cryogenic liquid storage system includes a sketch plate disposed above the slide bearing. The sketch plate may be configured to militate against leaked cryogenic liquid from escaping the cryogenic liquid storage system.

A method of assembling a cryogenic liquid storage system may include providing a primary container, an insulation material, and a composite material. The primary container may be disposed in a desired position. The primary container may be covered with the insulation material. Each of the primary container and the insulation material may be covered with the composite material to form the secondary container and a pressure release feature may be disposed through each of the primary container, the insulation portion, and the secondary container. In certain embodiments, a secondary bottom may be disposed below an insulative base of the cryogenic liquid storage system. The secondary bottom may include an expansion joint configured to permit an expansion and a retraction of the secondary bottom independent from the secondary container. In certain embodiments, a sand layer, a slide bearing, and the expansion joint permit the secondary bottom to move independent from the secondary container. In certain embodiments, the cryogenic liquid may be liquid hydrogen.

Advantageously, the cryogenic liquid storage system provides an economically constructed container which efficiently retains a cryogenic liquid such as liquid hydrogen by reducing the permeability, enhancing the insulation of the storage system and at the same time, providing protection against external hazards such as fire, missile impact explosions, etc. The secondary container may also be configured to provide containment in case of accidental leak of cryogenic liquid from the primary container.

EXAMPLES

Example embodiments of the present technology are provided with reference to the several figures enclosed herewith.

Figure 1:
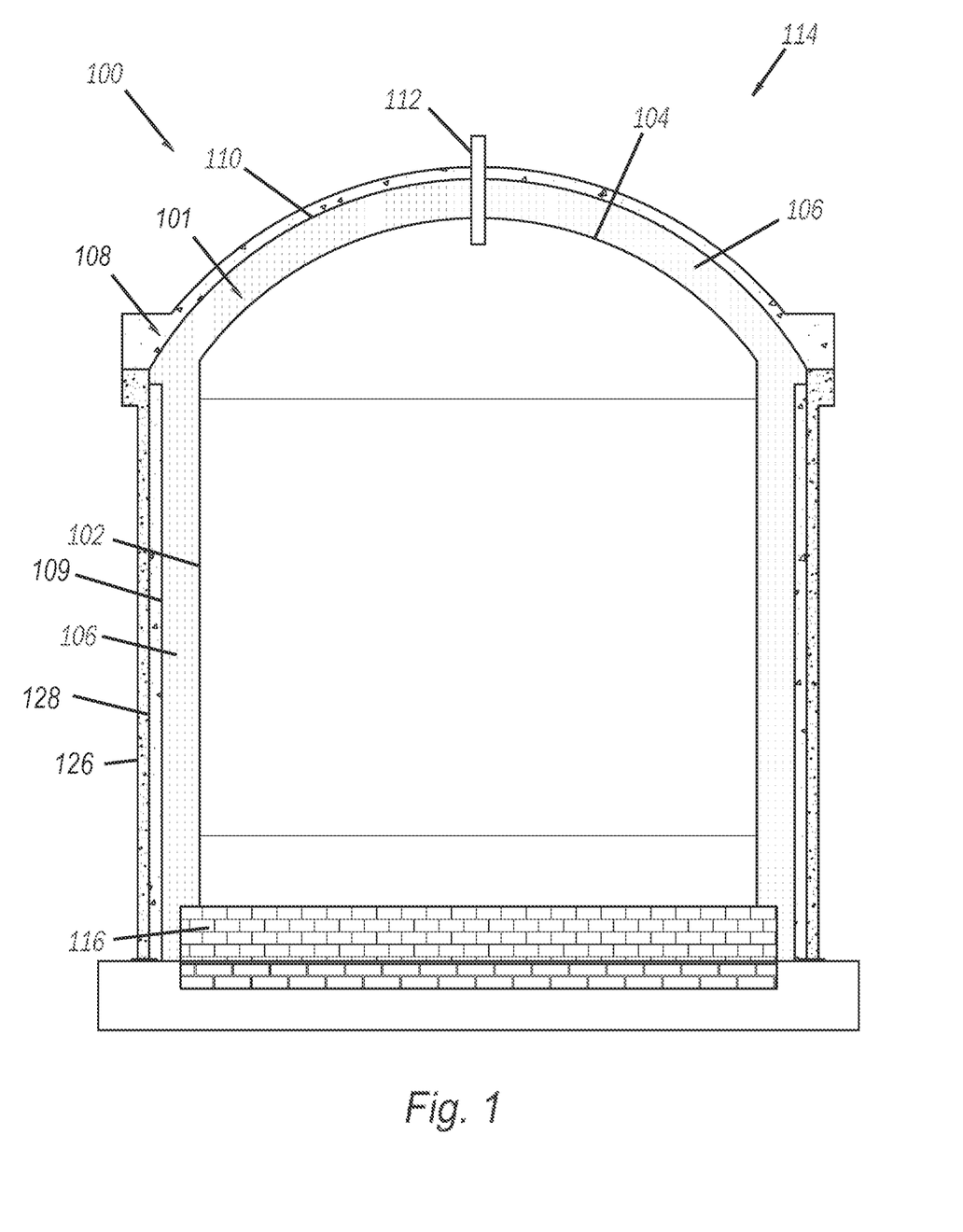
FIG. 1 shows a schematic view of an embodiment of a cryogenic liquid storage system, in accordance with the present technology.

As shown in FIG. 1, a cryogenic liquid storage system 100 is provided that includes a primary container 101, an insulation portion 106, a secondary container 108 and a pressure release feature 112. The primary container 101 may include a primary sidewall 102 and a primary dome 104, each formed at least in part using metal, where the primary container 101 is configured to retain a cryogenic liquid. The insulation portion 106 may cover the primary container 101. The secondary container 108 may include a secondary sidewall 109 and a secondary dome 110. The secondary container 108 may include a composite material that may cover each of the primary container 101 and the insulation portion 106. The pressure release feature 112 may be disposed through each of a primary dome 104, the insulation portion 106, and a secondary dome 110.

The primary container 101 may have certain functionalities that may be performed by various types of material. For example, the primary container 101 may be constructed from a material configured to militate against damage due to cryogenic liquid embrittlement, such as hydrogen embrittlement. As a non-limiting example, the primary sidewall 102 of the primary container 101 may include a carbon steel material or a stainless steel material or any other material that can sustain damage due to cryogenic liquid embrittlement. In certain circumstances, as shown in FIG. 1, the primary container 101 may include a primary sidewall 102 and primary dome 104. In certain circumstances, the primary sidewall 102 may be constructed using a composite material that is similar to construction of the secondary container 108, as described herein.

The insulation portion 106 may have certain functionalities that may be performed by various types of material. As a non-limiting example, the insulation portion 106 may be constructed from evacuated perlite powder. The evacuated perlite powder may be formed by filling the insulation portion 106 with perlite powder and applying a high level of vacuum to about 10 microns. Advantageously, the evacuated perlite powder may have a perlite density from 5 lb/ft$^3$ to 9 lb/ft$^3$. Desirably, the high-density insulation and the removal of air molecules may substantially decrease the rate of heat transfer and reduce boil-off in the cryogenic liquid storage system 100.

In certain embodiments, the cryogenic liquid storage system 100 may be provided in a standing configuration 114, as shown in FIG. 1. The standing configuration 114 may require the cryogenic liquid storage system 100 to further include an insulative base 116. The insulative base 116 may be constructed from material that militates against heat loss and that is able to withstand a high compressive load. As a non-limiting example, the insulative base 116 may be constructed from a cellular glass insulation, such as FOAMGLAS® cellular glass insulation, which is commercially available through Owens Corning (Toledo, OH). The insulative base 116 may be constructed from at least a four (4) foot thick base of the cellular glass insulation or similar insulative material. Advantageously, the increased thickness of the insulative base 116 may further militate against heat loss of the stored cryogenic liquid.

The secondary container 108 may have certain functionalities that may be performed by various types of material. For example, the secondary sidewall 109 and dome 110 may include materials that are configured to protect the primary container 101 and insulation portion 106 from external hazards such as fire, missile impact, and tornados. The material used to construct the secondary container 108 may also be configured to contain cryogenic liquid if the primary container 101 is breached. The secondary container 108 may be constructed from materials that are configured to enhance the structural integrity of the system and provide protection for the primary container 101. In certain embodiments, as shown in FIG. 1, the secondary container 108 may include the secondary sidewall 109 and the secondary dome 110. In certain circumstances, the secondary container 108 may include a precast concrete panel 128 with a carbon steel liner 126 disposed on either an inside or an outside surface. The pre-cast, prestressed concrete material may be formed by disposing a plurality of prestressed wires in a desired orientation and encapsulating the plurality of prestressed wires with shotcrete material. The prestressed wire may be disposed around the primary container 101 and prestressed by disposing the prestressed wire about the primary container 101 under tension.

Prestressing, for example, may include where a portion of the secondary container 108 is compressed by the prestressed wire. Precast portions of the secondary container 108 may be prestressed during the assembly process (pre-tensioning) or portions of the secondary container 108 may be stressed once completed (post-tensioning). Prestressing of the prestressed wires may compensate for the tensile stresses introduced when cryogenic liquid from the primary container may be released into the annular space between the primary container 101 and the secondary container 108. Hence the secondary container 108 may generally remain in compression in conjunction with the prestressed wire. The orientation of the prestressed wires may be a vertical orientation, a horizontal orientation, or both. In certain circumstances, where the secondary container 108 includes a precast concrete panel 128 with a carbon steel liner 126 disposed on either an inside or an outside surface, the carbon steel liner 126 may be covered with shotcrete for enhanced protection and insulation.

The pressure release feature 112 may include the following aspects. The pressure release feature 112 may permit the cryogenic gas to vent out of the cryogenic liquid storage system 100 if a predetermined threshold of pressure is exceeded. In certain embodiments, the pressure release feature 112 may include a pressure release valve disposed through the primary dome 104, the insulation portion 106, and the secondary dome 110.

Figure 2:
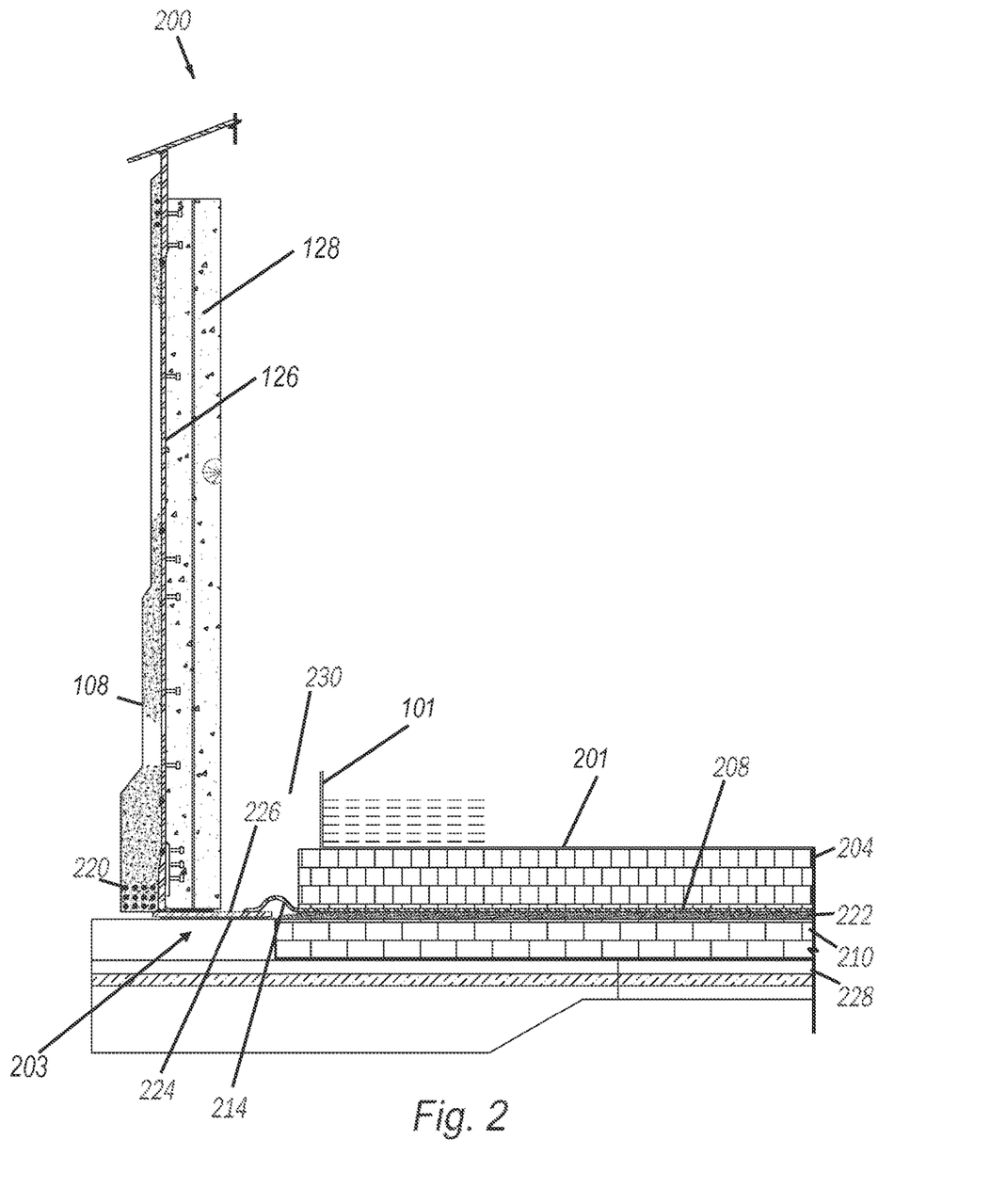
FIG. 2 shows a schematic view of a portion of another embodiment of a cryogenic liquid storage tank, in accordance with the present technology.

In certain embodiments, such as shown in FIG. 2, another embodiment of a cryogenic liquid storage system 200 may include a sliding or movable base 203 capable of accommodating an expansion and a retraction of a secondary bottom 208. The cryogenic liquid storage system 200 may include the primary container 101, a first insulation portion 204, the secondary container 108, a secondary bottom 208, and a second insulation portion 210. The primary container 101 may have a primary bottom 201. The first insulation portion 204 may be disposed below the primary bottom 201. The secondary bottom 208 may be disposed below the first insulation portion 204. The secondary bottom 208 may have an expansion joint 214. The second insulation portion 210 may be disposed below the secondary bottom 208. In certain embodiments, the secondary container 108 may include a carbon steel liner 126.

The primary container 101, the primary bottom 201, the secondary container 108, and/or the secondary bottom 208 may have certain functionalities that may be performed by various types of material. For example, the primary container 101, the primary bottom 201, and/or the secondary bottom 208 may include nickel-based steel or stainless steel. The nickel-based steel may include around 9% nickel. Advantageously, the 9% nickel-based steel and stainless steel material may enhance the structural integrity of the primary container 101 and primary bottom 201. The secondary container 108 may include precast or cast-in-place prestressed concrete wall with steel liner. The precast, prestressed concrete wall may be made composite with the carbon steel liner 126 located on the outside face of the wall. The bottom portion of the carbon steel liner 126 may be fabricated from 9% nickel-based steel. The entire secondary container 108 wall may be circumferentially prestressed using high strength steel wires encapsulated in shotcrete. One skilled in the art may select other suitable materials to construct the primary container 101, the primary bottom 201, the secondary container 108, and/or the secondary bottom 208 within the scope of the present disclosure.

Where the second insulation portion 210 is disposed as shown in FIG. 2, the second insulation portion 210 may be advantageously protected by the secondary bottom 208 if a cryogenic liquid is leaked from the primary container 101 or primary bottom 201. For instance, where the cryogenic liquid is leaked within the cryogenic liquid storage system 200, the secondary bottom 208 may be configured to militate against the leaked cryogenic liquid from saturating the second insulation portion 210. In certain embodiments, the second insulation portion 210 would then still provide an insulative buffer militating against a rapid change in temperature in the soil beneath the cryogenic liquid storage system 200, where cryogenic liquid is leaked within the cryogenic liquid storage system 200.

The secondary container 108 may include the carbon steel liner 126 formed compositely with a concrete material. The carbon steel liner 126 may be located on the outside face of the concrete wall, in contrast to its location on the inside face of the wall for known secondary containers with fixed base and a thermal corner protection (TCP) system. In certain embodiments, the secondary container 108 may be formed by precast concrete panels 128. The precast concrete panels 128 may have a carbon steel liner 126. Prestressed wire 220 may be disposed on an outer surface of the carbon steel liner 126. The prestressed wire 220 may compress the secondary container 108 to compensate for the tensile stresses generated by the volume of spilled cryogenic liquid and resulting thermal gradients. Hence, a certain portion of the secondary container 108 and carbon steel liner 126 may generally remain in compression in conjunction with the prestressed wire 220. In certain embodiments, the orientation of the prestressed wire 220 may be a vertical orientation, a circumferential orientation, or both. The circumferentially placed prestressed wire 220 may be encapsulated with shotcrete to provide protection against corrosion. The vertically placed prestressed wire 220 may be incorporated in concrete panels. The joints between each of the precast concrete panels 128 may also be filled with shotcrete.

The first insulation portion 204 and the second insulation portion 210 may have certain functionalities that may be performed by various types of material. For example, the first insulation portion 204 and the second insulation portion 210 may be constructed from materials that militate against heat loss and are able to withstand a high compressive load. As a non-limiting example, the first insulation portion 204 and the second insulation portion 210 may be constructed from cellular glass insulation, such as FOAMGLAS® cellular glass insulation, which is commercially available through Owens Corning (Toledo, OH). A skilled artisan may select other suitable materials to construct the first insulation portion 204 and the second insulation portion 210, within the scope of the present disclosure.

In certain embodiments, as shown in FIG. 2, the cryogenic liquid storage system 200 may include ways to accommodate the expansion/retraction of the secondary container 108 where leaked cryogenic liquid rapidly changes the temperature of the secondary container 108. For instance, the expansion joint 214 of the secondary bottom 208 may be configured to permit an expansion/retraction of the secondary bottom 208 independent from the secondary container 108. The secondary bottom 208 may include a sand layer 222 disposed below the primary container 101 and a polytetrafluoroethylene (PTFE) slide bearing 224 disposed below the secondary container 108. In certain embodiments, each of the sand layer 222, the slide bearing 224, and the expansion joint 214 permit the secondary bottom 208 to move freely, independent from the secondary container 108. In certain embodiments, where the secondary bottom 208 retracts rapidly due to leaked cryogenic liquid, the free movement of secondary bottom 208 may militate against the secondary container 108 from also rapidly moving inward toward a center of the cryogenic liquid storage system 200, thereby also potentially cracking the secondary container 108. In certain embodiments, the sand layer 222 may be replaced with a concrete layer.

Where the secondary bottom 208 may move freely, independent from the secondary container 108, the secondary container 108 may include a way to enhance the structural integrity of the cryogenic liquid storage system 200 near where the secondary bottom 208 meets the secondary container 108. For instance, a bottom, outer edge of the secondary container 108 may include a sketch plate 226. The sketch plate 226 may include a thicker portion of steel that is configured to militate against leaked cryogenic liquid from escaping the cryogenic liquid storage system 200. In certain embodiments, the sketch plate 226 may include around 9% percent nickel. The sketch plate 226 may be disposed above the slide bearing 224 and/or a bearing pad. One skilled in the art may select other suitable ways of enhancing the structural integrity of the cryogenic liquid storage system 200, near where the secondary bottom 208 meets the secondary container 108, within the scope of the present disclosure.

In certain circumstances, the cryogenic liquid storage system 200 may include ways of keeping the soil beneath the second insulation portion 210 at steady temperature where cryogenic liquid is leaked within the cryogenic liquid storage system 200. For instance, the cryogenic liquid storage system 200 may further include a thermal element 228 disposed in the soil beneath the second insulation portion 210. The thermal element 228 may be configured to keep the soil under the cryogenic liquid storage system 200 at a constant temperature. Where cryogenic liquid is leaked within the cryogenic liquid storage system 200, the thermal element 228 may be configured to militate against the soil from rapidly changing temperature.

In the event of a cryogenic liquid spill from the primary container 101 at any elevation or at the primary bottom 201, cryogenic liquid will meet the secondary bottom 208 or the precast concrete panel 128 on the inside face. The resulting thermal gradient may cause cracking on the inside surface of the precast concrete panel 128 but will maintain the structural integrity and vapor tightness of the carbon steel liner 126. Thus, the vapor loss from the cryogenic liquid storage system 200 will be prevented in the event of the cryogenic liquid spill, irrespective of the height and volume of the cryogenic liquid spill from the primary container.

Three components of the sliding or movable base 203, the expansion joint 214 and its location, the second insulation portion 210 and its location, and the carbon steel liner 126 located on the outside face of the precast concrete panel 128 together constitute a novel way of assembling a full containment or a cryogenic liquid storage system 200. In certain circumstances, an annular space 230 may be created between the primary container 101 and the secondary container 108. Advantageously, the annular space 130 may militate against the temperature of the cryogenic liquid from conducting with the secondary container 108.

Figure 3:
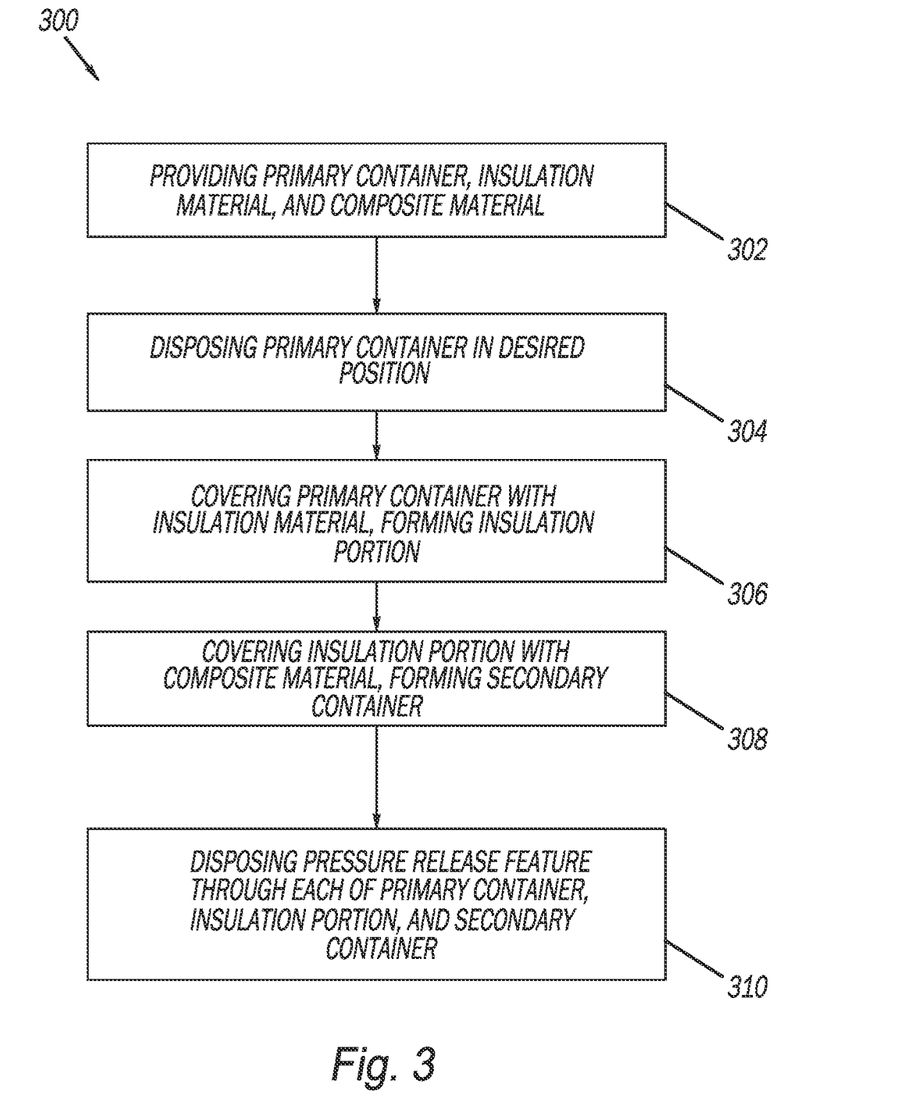
FIG. 3 shows a flowchart of a method for assembling a cryogenic liquid storage system, in accordance with the present technology.

FIG. 3 shows a method 300 of assembling a cryogenic liquid storage system. As shown in FIG. 3, in step 302 a primary container 101, an insulation portion 106, and a composite material are provided. The primary container 101 may be disposed in a desired position in step 304. In step 306, the primary container 101 may be covered with the insulation material, forming an insulation portion 106. In step 308, the insulation portion 106 may be covered with the composite material, forming the secondary container 108. The method 300 may include a further step 310 of disposing a pressure release feature 112 through each of the primary container 101, the insulation portion 106, and the secondary container 108.

In certain embodiments, a secondary bottom may be disposed below an insulation layer of the cryogenic liquid storage system 100. The secondary bottom 208 may include an expansion joint 214 configured to permit an expansion and a retraction of the secondary bottom 208 independent from the secondary container 108. In certain embodiments, a sand layer 222, a slide bearing 224, and the expansion joint 214 permit the secondary bottom 208 to move independent from the secondary container 108. In certain embodiments, the cryogenic liquid may include liquid hydrogen.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions, and methods may be made within the scope of the present technology, with substantially similar results.

What is claimed is:

1. A cryogenic liquid storage system, comprising:
    a primary container including a primary sidewall and a primary dome, where the primary container is configured to retain the cryogenic liquid;
    an insulation portion covering the primary container;
    a secondary container including a secondary sidewall and a secondary dome; and
    a pressure release feature disposed through each of the primary container dome, the insulation portion, and the secondary container dome,
    wherein the secondary container includes a precast, prestressed concrete material with a steel liner disposed on one of an inside and an outside surface of the secondary container.

2. The cryogenic liquid storage system of claim 1, wherein the secondary container includes a composite material covering each of the primary container and the insulation portion.

3. The cryogenic liquid storage system of claim 1, wherein the primary sidewall includes one of a carbon steel material, a stainless steel material, and combinations thereof.

4. The cryogenic liquid storage system of claim 1, wherein the primary container and the secondary container are constructed using an identical composite material.

5. The cryogenic liquid storage system of claim 1, wherein the insulation portion includes evacuated perlite powder.

6. The cryogenic liquid storage system of claim 5, wherein the evacuated perlite powder has a perlite density from 5 lb/ft$^3$ to 9 lb/ft$^3$.

7. The cryogenic liquid storage system of claim 1, further including an insulative base.

8. The cryogenic liquid storage system of claim 7, wherein the insulated base includes a cellular glass insulation.

9. The cryogenic liquid storage system of claim 1, wherein the cryogenic liquid is liquid hydrogen.

10. A cryogenic liquid storage system, comprising:
    a primary container including a primary sidewall and a primary dome, where the primary container is configured to retain the cryogenic liquid;
    an insulation portion covering the primary container;
    a secondary container including a secondary sidewall and a secondary dome;
    a pressure release feature disposed through each of the primary container dome, the insulation portion, and the secondary container dome; and
    a secondary bottom disposed below the insulation portion, wherein the secondary bottom includes an expansion joint configured to permit an expansion and a retraction of the secondary bottom independent from the secondary container.

11. The cryogenic liquid storage system of claim 10, wherein the secondary bottom includes a sand layer below the primary container and a slide bearing below the secondary container.

12. The cryogenic liquid storage system of claim 11, wherein each of the sand layer, the slide bearing, and the expansion joint permit the secondary bottom to move independent from the secondary container.

13. The cryogenic liquid storage system of claim 12, further including a sketch plate disposed above the slide bearing, where the sketch plate is configured to militate against leaked cryogenic liquid from escaping the cryogenic liquid storage system.

14. A method of assembling a cryogenic liquid storage system comprising:
    disposing a primary container in a desired position;
    covering the primary container with an insulation portion; and
    covering each of the primary container and the insulation portion with a composite material to form a secondary container;
    disposing a pressure release feature through each of the primary container, the insulation portion, and the secondary container, and
    disposing the primary container on a base, the base including a secondary bottom below the insulation portion of the cryogenic liquid storage system, wherein the secondary bottom includes an expansion joint configured to permit an expansion and a retraction of the secondary bottom independent from the secondary container.

15. The method of claim 14, wherein a sand layer, a slide bearing, and the expansion joint permit the secondary bottom to move independent from the secondary container.

16. The method of claim 14, further comprising storing a cryogenic liquid in the cryogenic liquid storge system, wherein the cryogenic liquid is liquid hydrogen.

\* \* \* \* \*